United States Patent [19]

Lee

[11] Patent Number: 4,711,393

[45] Date of Patent: Dec. 8, 1987

[54] WATER TEMPERATURE CONTROL DEVICE

[76] Inventor: Jimmy Lee, 20 John St., Enfield, Conn. 06082

[21] Appl. No.: 15,081

[22] Filed: Feb. 17, 1987

[51] Int. Cl.⁴ ............................................. G05D 23/13
[52] U.S. Cl. ................................. 236/12.15; 137/607; 236/99 J
[58] Field of Search .................. 236/12.15, 93 A, 99 J, 236/99 F, 99 R; 137/607, 862

[56] References Cited

U.S. PATENT DOCUMENTS

| | | | |
|---|---|---|---|
| 566,977 | 9/1896 | Frobil | 236/99 R |
| 849,534 | 4/1907 | Ellis | 137/862 X |
| 1,153,547 | 9/1915 | Finney | 236/12.15 |
| 1,948,044 | 2/1934 | Myers et al. | 137/607 X |
| 2,296,917 | 9/1942 | Garrett et al. | 236/12.15 |
| 2,584,420 | 2/1952 | Bronson | 236/12.15 |
| 2,814,445 | 11/1957 | Crawley | 236/12.15 |
| 4,344,450 | 8/1982 | Walters | 236/99 R X |
| 4,558,817 | 12/1985 | Kiendl | 236/12.15 X |

*Primary Examiner*—William E. Tapolcai
*Attorney, Agent, or Firm*—Peter R. Bahn

[57] ABSTRACT

A water temperature control device wherein the relative inflows of hot and cold water into a mixing chamber and then to an outlet are controlled by a mercury filled temperature sensing element, the volume expansion or contraction of the mercury activating a slave cylinder and connecting linkage to open and close in compensatory fashion the valves allowing increased and decreased water flows from the cold and hot water supplies.

1 Claim, 8 Drawing Figures

WATER TEMPERATURE CONTROL DEVICE

BACKGROUND OF THE INVENTION

This invention relates to the filed of automatic control devices in general and to the field of water temperature control devices in particular.

Automatic informational feed-back devices for regulating the rate of machine energy use has been known ever since the first fly wheel governor was used with a steam engine. Simple thermostatic switches employing double-side strips of metal with differing thermal expansion coefficients have also been long known, In fact, the desirability of machines that tend to themselves rather than require the constant attention of a human opertor, has in general led to the development of a multitude of automatic control devices at the present time.

The invention to be described here is a constant temperature automatic water temperature control device. When connected to any standard hot water and cold water supplies, this device will insure the proper mixing of such hot water and cold water to yield mixed water at a constant uniform temperature despite any fluctuations that might occur in the temperatures of the hot and cold water supplies respectively.

SUMMARY OF THE INVENTION

This invention works somewhat like a thermostat except that it employs a mercury filled tube as a temperature sensitive element instead of a solid bi-metal strip.

Separate flows of hot water and cold water are allowed to mix in a heat exchange chamber which contains the mercury filled temperature sensitive element. If the temperature of the mixed water is hotter than the appropriate control setting, the mercury expands in volume thereby activiating a slave cylinder linkage which partially closes a hot water valve and partially opens a cold water valve. If the temperature of the mixed water is colder than the approrpiate control setting, the mercury contracts in volume thereby activating the slave cylinder linkage in the opposite direction to partially close the cold water valve and partially open the hot water valve.

The temperature control setting is adjusted by manually turning a threaded piston rod and attached piston in a control cylinder so as to effect a change in the total volume within which the mercury is confined.

In this manner once a particular temperature control setting is chosen for the device, it will always produce mixed water at that precise temperature no matter what the individual temperatures of the hot and cold water supplies, respectively, may be, and despite any fluctuations in such hot and cold water supplies.

In addition, by the compensatory opening and closing of both hot water and cold water valves simultaneously, this device maintains a constant water pressure issuing from its water outlet in addition to maintaining a constant water temperature.

DETAILED DESCRIPTION OF THE INVENTION

The invention is shown in detail in the accompanying figures.

Figure 1:
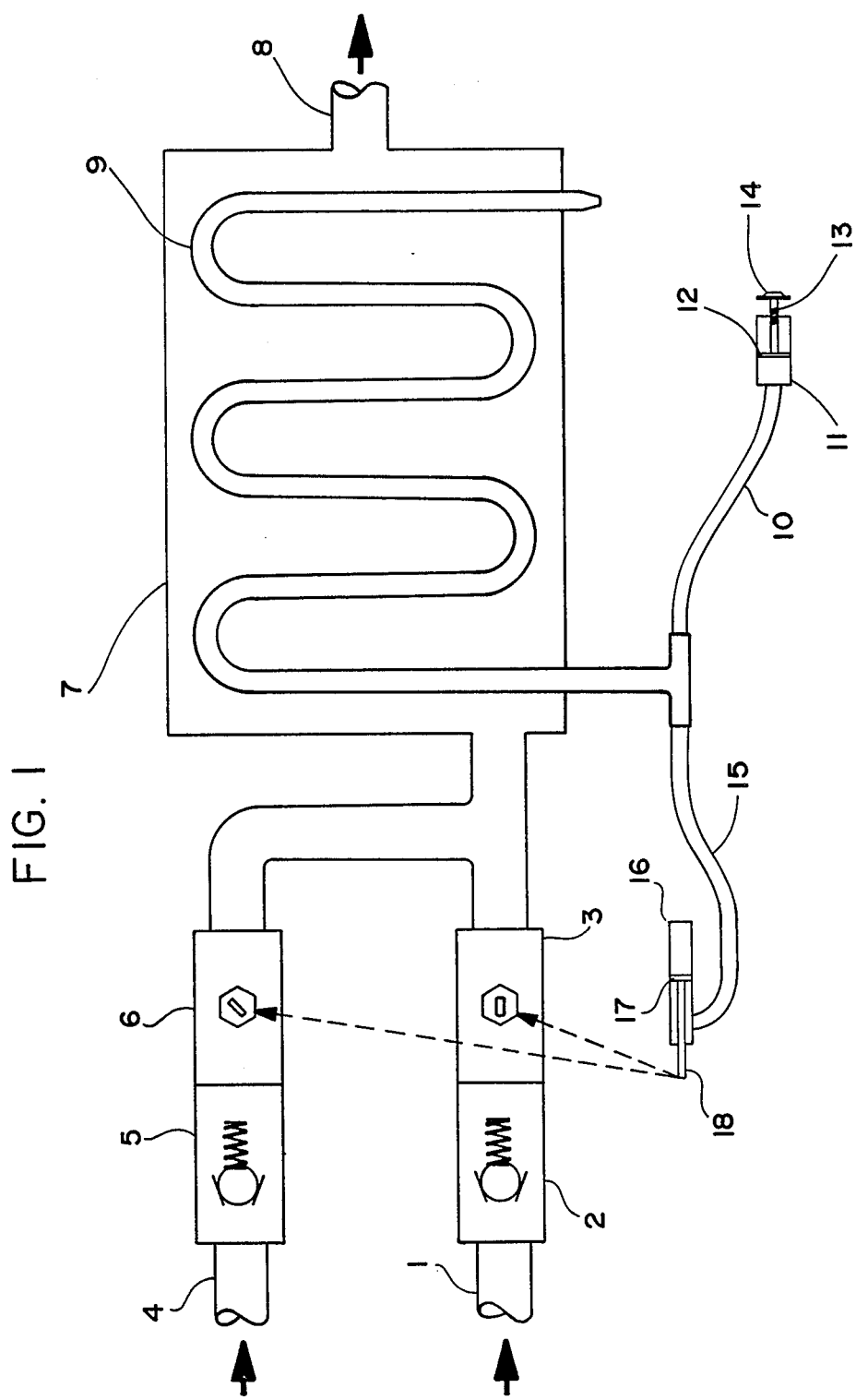
FIG. 1 shows a schematic diagram of the central concept utilized in this invention.

Referring now particularly to FIG. 1, it is seen that among the key parts of the invention are a hot water inlet 1 followed by a hot water check valve 2, followed in turn by a hot water ball valve 3, and also a cold water inlet 4 followed by a cold water check valve 5, followed in turn by a cold water ball valve 6.

The hot water passage and the cold water passage join together before entry into a heat exchange or mixing chamber 7 and thence to a water outlet 8.

Running in snake-like fashion through the mixing chamber is a temperture sensing tubing 9 which is filled with a temperature sensitive fluid, the volume of which fluid increases with increasing temperature. Mercury is the most suitable fluid for this purpose but alcohol or water may also be used.

Contiguous with the temperature sensing tubing and the fluid within is an extension tubing 10 which leads to a temperature control cyliner 11. The temperature control cylinder houses a piston 12, the position of which is adjusted by turning the connected threaded piston rod 13 by manually turning a temperature control knob 14.

Also contiguous with the temperature control tubing and the fluid within is another extension tubing 15 which leads to a slave cylinder 16. The slave cylinder houses a piston 17 to which is connected a piston rod 18. This piston rod is connected by a mechanical linkage indicated by the two broken lined arrows in FIG. 1 such that when the piston rod 18 is extended out of the slave cylinder the hot water ball valve 3 is open and the cold water ball valve 5 is closed. Conversely, when the piston rod 18 is compressed into the slave cylinder, the hot water ball valve 3 is closed and the cold water ball valve 5 is open.

The main principle by which the invention works is as follows. At a particular setting of the temperature control, the hot and cold water are mixed to arrive at an intermediate temperature. The volume of the temperature sensitive fluid either expands or contracts in response to the intermediate temperature of the mixed water. As the temperature sensitive fluid expands or contracts, it compresses or extends the position of the slave cylinder piston rod which in turn closes and opens the hot water and cold water ball valves respectively to maintain a constant temperature for the mixed water that emerges from the water outlet of the invention. In short, the invention is an automatic feed back device for maintaining a constant temperature water supply.

Figure 2:
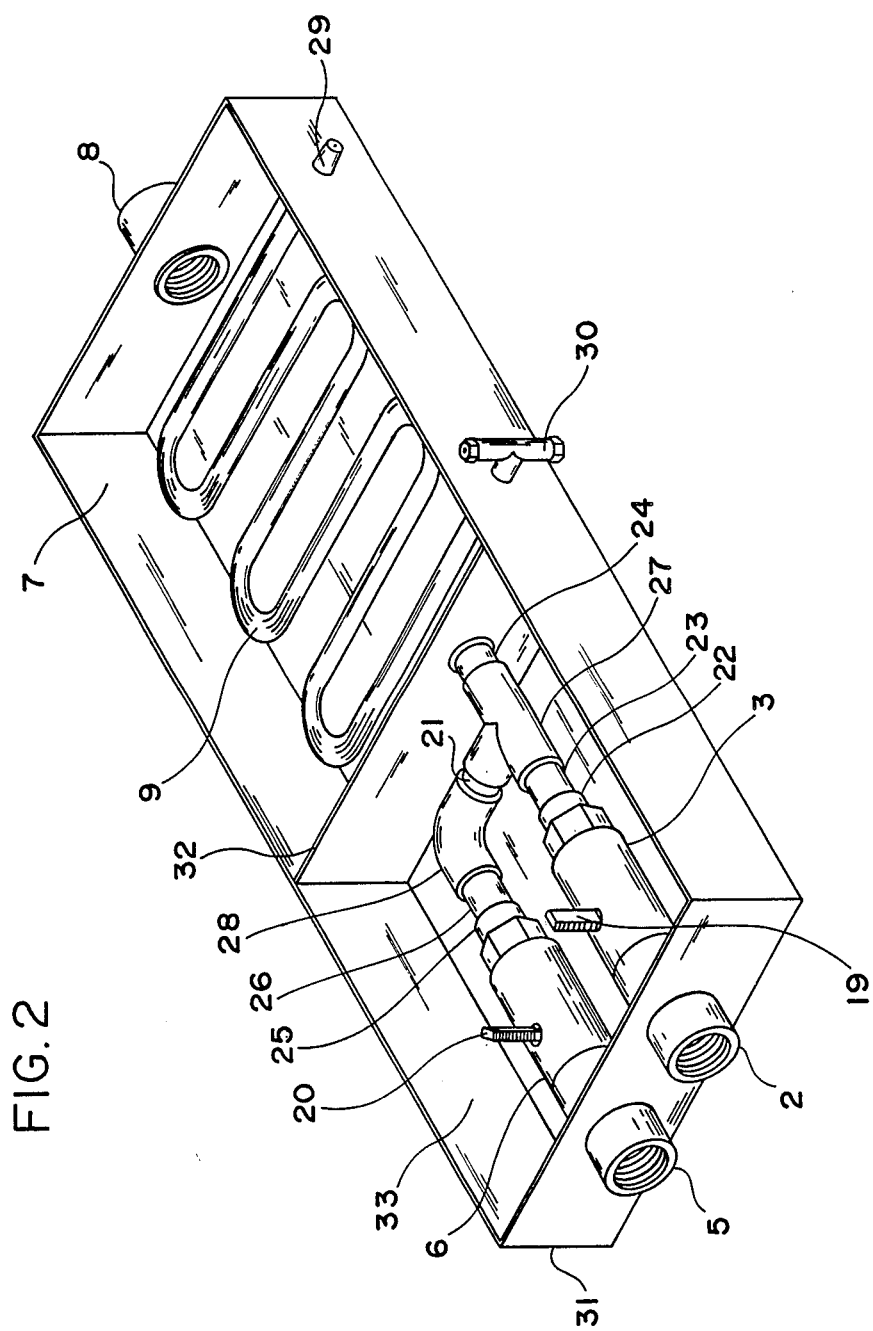
FIG. 2 is an elevated front-facing isometric view of the invention without its control mechanisms.

Referring now particularly to FIG. 2, it is seen that this invention is housed in a metal box 31 which is divided by a partition 32 into a control chamber 33 and a mixing chamber 7. Shown, also, are the hot water check valve 2 and the cold water check valve 5. The check valves are followed by the hot water ball valve 3 and the cold water ball valve 6. The axles of these ball valves 19 and 20 are the means, respectively, by which such ball valves are opened or closed. The ball valves are followed by standard plumbing components 21, 22, 23, 24, 25, 26, 27, and 28, by which water flow is directed from the control chamber to the mixing chamber.

Inside the mixing chamber is shown the temperature sensing tubing 9 which is made of copper. At one end of the temperature sensing tubing is a standard valve stem 29 which serves as a filler and bleed off point for the temperature sensing tubing. At the other end of the temperature sensing tubing is a T-joint 30 which leads to the control tubing (not shown in FIG. 2). Finally, shown, also, is the water outlet 8 exiting from the mixing chamber.

During normal operation of this invention, it is seen that the mixing chamber 7 will be filled wath water, whereas the control chamber 33 will be dry.

Figure 3:
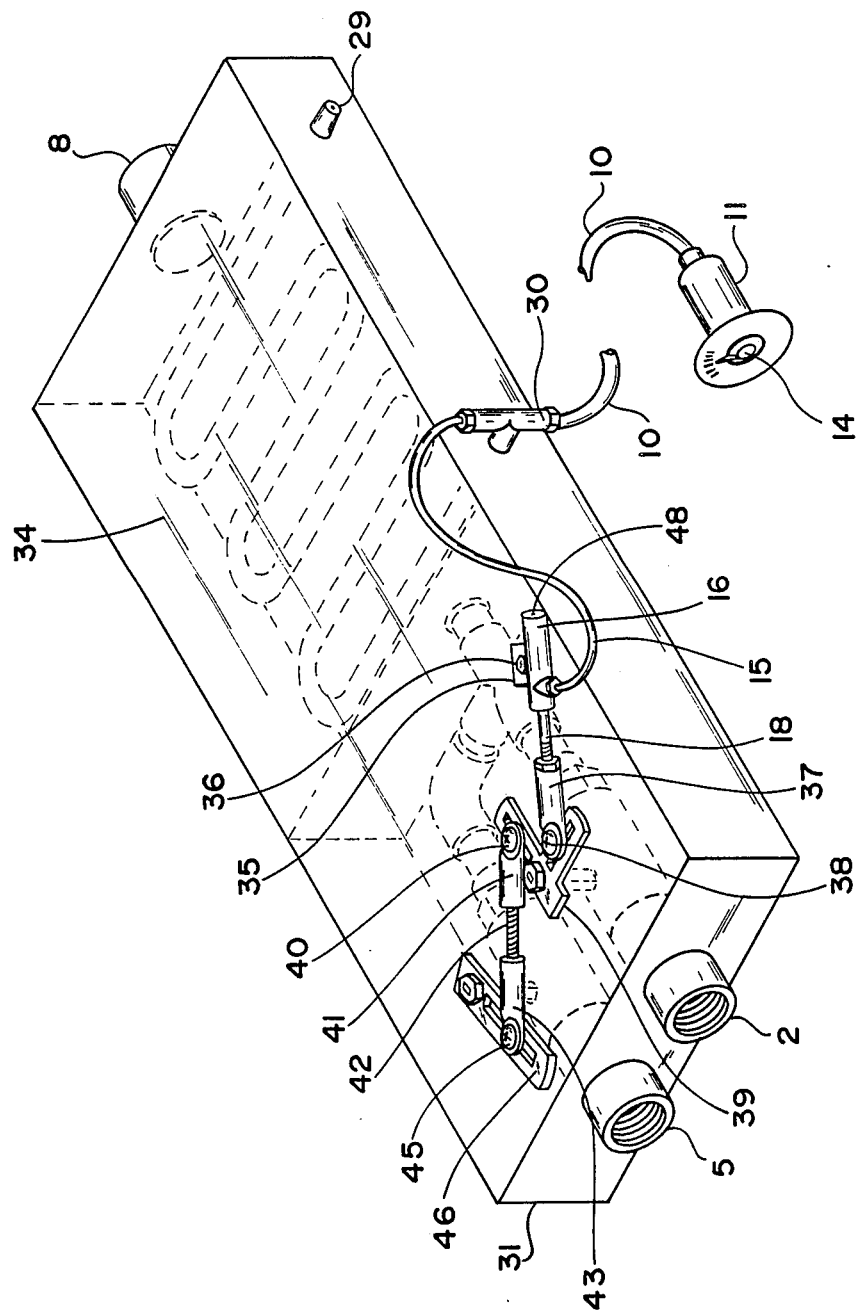
FIG. 3 is an elevated front-facing isometric view of the invention showing its control mechanisms.

FIG. 3 shows the details of the control mechanism of the invention. One branch of the T-joint 30 leads to a nylon tubing 10 which in turn leads to the temperature control cylinder 11. The position of the piston within the control cylinder is manually adjusted by turning the knob 14 against a stationary vernier temperature scale 47.

The other branch of the T-joint leads to a nylon tubing 15 which in turn leads to a slave cylinder 16. The slave cylinder is pivotally attached to the lid 34 of the box 31 by a bolt 36 which extends through the slave cylinder tab 35 and screws into the box lid.

The slave cylinder piston rod 18 is connected to the first hot water armature 37 by virtue of being screwed into the end of such armature. The first hot water armature is then pivotally connected to the short section of the hot water L-plate 39 by a shoulder bolt 38. The vertex of the L-plate is connected to the axle of the hot water ball valve.

The long section of the L-plate is connected by another shoulder bolt 40 to a second hot water armature 41, which in turn is connected by a threaded rod 42 to the cold water armature 43. The cold water armature 43 is connected by a third shoulder bolt 45 to the linear cold water plate 46 which in turn is connected to the axle of the cold water ball valve.

Also, it should be noted that the air-filled side of the slave cylinder 16 contains a small air bleed-off part hole 48 which is necessary for proper operation of the slave cylinder.

Figure 4:
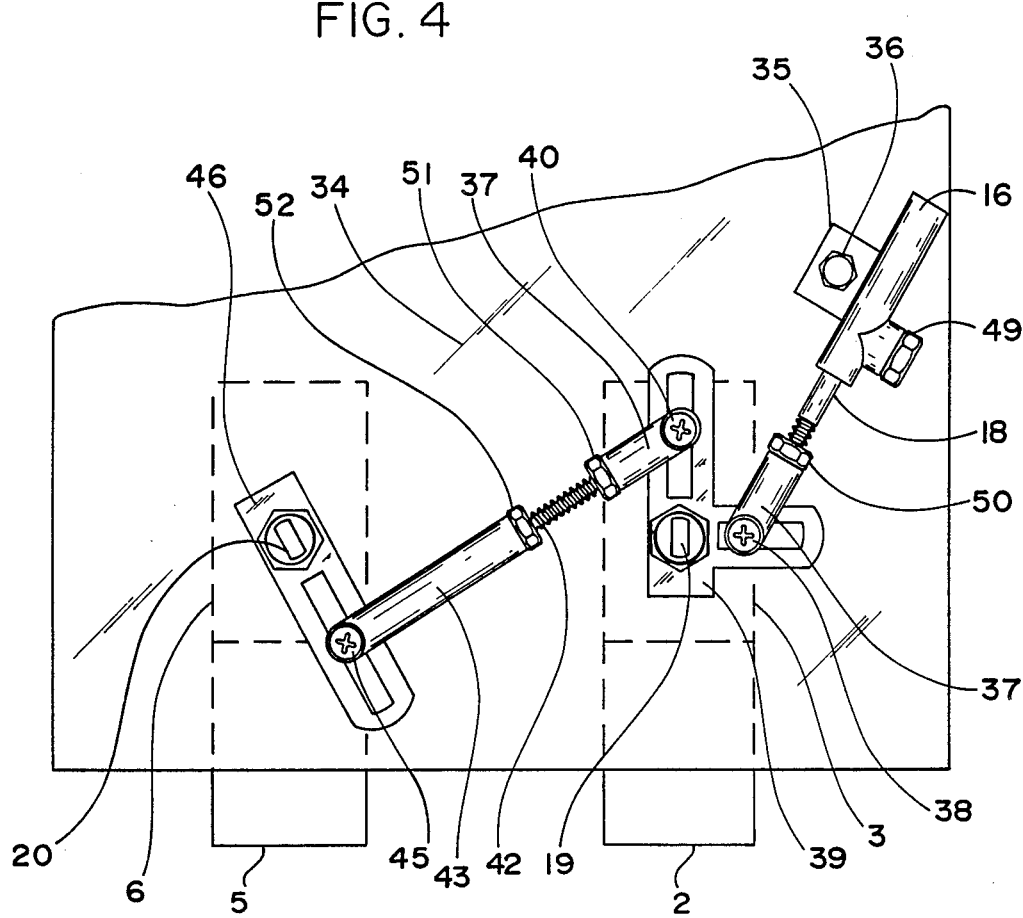
FIG. 4 is a top view of the mechanical linkages of the invention.

FIG. 4 shows a top view of the slave cylinder and its mechanical linkage to the hot water ball valve and the cold water ball valve. Thus, the slave cylinder 16 is pivotally held onto the box lid 34 by a bolt 36 inserted through the slave cylinder tab 35. A jam nut 49 is used to secure the fluid filled nylon tubing referred to previously onto the slave cylinder. The piston rod 18 is secured onto the armature 38 by a jam nut 50. The threaded rod 42 is secured to the armatures 37 and 43 by the jam nuts 51 and 52, respectively.

It can be seen by studying FIG. 4 that when the ball valve 3 is opened by the extension of piston rod 18, the ball valve 3 is closed. Conversely, when the ball valve 3 is closed by the compression of piston rod 18, the ball valve 6 is opened.

Figure 5:
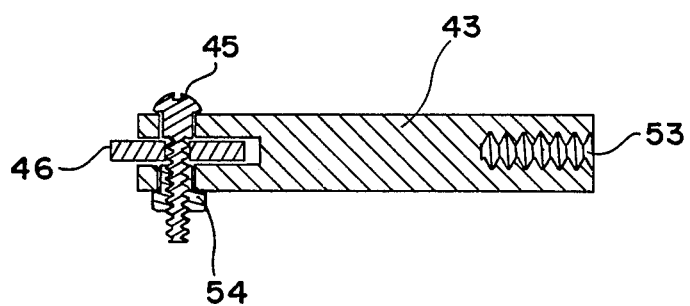
FIG. 5 is a cross-sectional view of one pivoting armature within the mechanical linkage.

FIG. 5 shows a cross sectional view of the pivotal linkage between armature 43 and plate 46. At one end of the armature 43 is a threaded cavity 53 into which the threaded rod 42, referred to preiously, is screwed. Armature 43 and plate 46 are held together by a shoulder bolt 45 and a shoulder nut 54, which allow the armature and the plate to pivot while maintaining the pivot at a stationary point (in the translational sense) along the slot of plate 46. It is the function of the slots in plates 46 and 39 to allow for adjustment of the shoulder nut pivot points where necessary for proper calibration of the water temperature control device.

Figure 6:
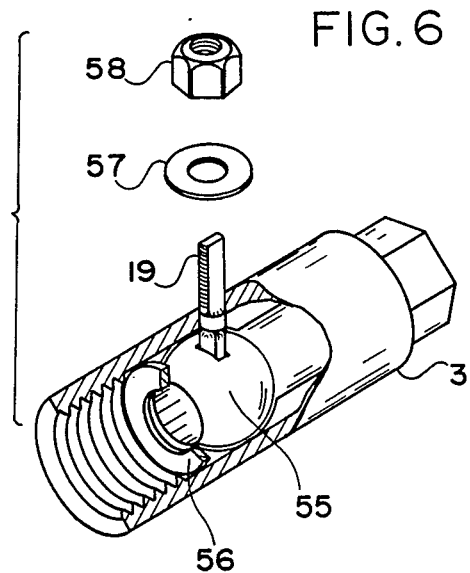
FIG. 6 is an isometric view of one of the ball valves of the invention.

FIG. 6 shows a detailed view of a common ball valve which is used in this invention. The ball valve 3 contains a ball 55 with a hole running through it, an interior seal washer 56 and an axle 19 rigidly stuck into the ball.

A linkage plate is connected to the ball valve by inserting the axle 19 through a rectangular hole hole in such linkage plate, and then putting a washer 57 on the axle, and finally screwing a nut 58 onto the threaded sides of the axle.

Figure 7:
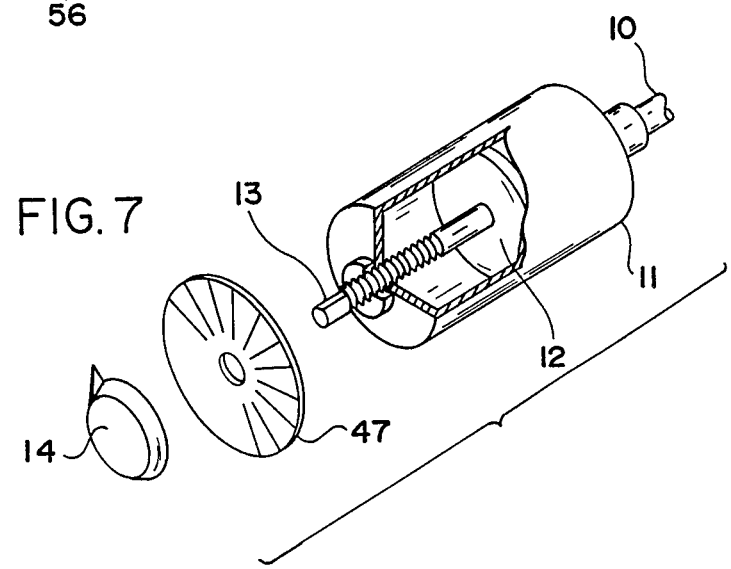
FIG. 7 is an isometric view of the temperature control cylinder of the device.

FIG. 7 shows a detailed view of the temperature control cylinder. The control cylinder 11 is connected to the nylon tubing 10 and contains a piston 12 to which is attached a threaded piston rod 13 which screws through a threaded hole in the casing of control cylinder 12. The control piston rod 13 is turned manually by use of the indicator knob 14. The relative position of the piston 12 within the control cylinder is indicated by where the knob indicator reads on the vernier scale 47 which is held stationary relative to the rotation of the piston rod 13.

Figure 8:
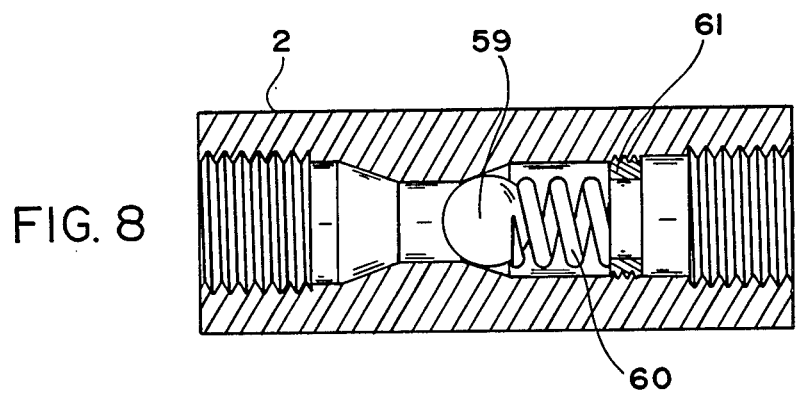
FIG. 8 is a cross-sectional view of a check valve of the invention.

FIG. 8 shows a cross sectional view of a common one-way check valve which is used in this invention. As its name implies, the purpose of a one-way check valve is to allow a flow of water in one direction but not in the opposite direction. The check valve shown in FIG. 8 allows a flow of water to the left but not to the right.

The check valve 2 contains a ball 59 which is held against an interior orifice by a spring 60, which in turn is held in place by a threaded ring 61.

It should be clear to the typical practitioner in this field of art that this invention may be practiced within a number of different embodiments without diverging from the central concept of the claimed invention.

What is claimed is:

1. A water temperature contorl device comprising:
   a cold water inlet communicating sequentially with a check valve, a ball valve, and a mixing chamber;
   a hot water inlet communicating sequentially with another check valve, another ball valve, and the said mixing chamber;
   a tubing extending through, but not communicating with, the interior of said chamber; said tubing communicating with a temperature control cylinder housing a piston and a threaded piston rod adjustable with a vernier dial;
   said tubing also communicating with a slave cylinder housing another piston and another piston rod which is connected by a linkage means to the said ball valves such that when the slave cylinder piston rod is extended, the said linkage means opens the hot water ball valve and closes the cold water ball valve; and when the slave cylinder piston rod is compressed, the said linkage means closes the hot water ball valve and opens the cold water ball valve;
   a temperature-volume sensitive liquid within the said tubing, temperature control cylinder, and slave cylinder, such that a temperature increase within the said mixing chamber will increase the temperature of the said liquid-filled tubing extending through said chamber, leading to an increased volume of said liquid, thereupon compressing the slave cylinder piston;

wherein the said linkage means is comprised of:
an armature with a threaded cavity into which is screwed the end of the said slave cylinder piston rod, such rod being threaded at its extended end;
the said armature being positionally adjustable along and pivotally connected by a shoulder bolt and shoulder nut to the long section of an L-shaped plate, said L-shaped plate being firmly connected at its vertex to the rotatable axle of the said hot water ball valve;

the short section of the said L-shaped plate being adjustably and pivotally connected by a shoulder bolt and a shoulder nut to another armature with a threaded cavity, which in turn is connected by a threaded rod to a third armature with a threaded cavity, the said third armature being adjustably and pivotally connected to a linear plate, said linear plate being firmly attached at one end to a rotatable axle of the said cold water ball valve.

* * * * *